(12) United States Patent
Wu et al.

(10) Patent No.: US 7,670,984 B2
(45) Date of Patent: Mar. 2, 2010

(54) HYDROCARBON-SOLUBLE MOLYBDENUM CATALYST PRECURSORS AND METHODS FOR MAKING SAME

(75) Inventors: Zhihua Wu, Lawrenceville, NJ (US); Zhenhua Zhou, Lawrenceville, NJ (US); Bing Zhou, Cranbury, NJ (US)

(73) Assignee: Headwaters Technology Innovation, LLC, Lawrenceville, NJ (US)

( * ) Notice: Subject to any disclaimer, the term of this patent is extended or adjusted under 35 U.S.C. 154(b) by 1016 days.

(21) Appl. No.: 11/327,085

(22) Filed: Jan. 6, 2006

(65) Prior Publication Data
US 2007/0158238 A1 Jul. 12, 2007

(51) Int. Cl.
*B01J 31/00* (2006.01)
*B01J 21/02* (2006.01)
*B01J 23/00* (2006.01)
*B01J 21/04* (2006.01)
*B01J 23/02* (2006.01)

(52) U.S. Cl. .................. 502/150; 502/170; 502/172; 502/204; 502/321; 502/439

(58) Field of Classification Search .................. 502/150, 502/170, 172, 204, 321, 439
See application file for complete search history.

(56) References Cited

U.S. PATENT DOCUMENTS

| | | | |
|---|---|---|---|
| 3,362,972 A | 1/1968 | Kollar | 260/414 |
| 3,578,690 A | 5/1971 | Becker | 260/414 |
| 3,595,891 A | 7/1971 | Cavitt | 260/429 |
| 3,953,362 A | 4/1976 | Lines et al. | 252/431 |
| 3,983,028 A | 9/1976 | McCollum et al. | |
| 4,022,681 A | 5/1977 | Sheng et al. | |
| 4,066,561 A | 1/1978 | Nnadi | |
| 4,125,455 A | 11/1978 | Herbstman | 208/108 |
| 4,134,825 A | 1/1979 | Bearden, Jr. et al. | |
| 4,151,070 A | 4/1979 | Allan et al. | 208/59 |
| 4,181,601 A | 1/1980 | Sze et al. | |
| 4,192,735 A | 3/1980 | Aldridge et al. | 208/112 |
| 4,325,802 A | 4/1982 | Porter et al. | 585/242 |
| 4,352,729 A | 10/1982 | Jacquin et al. | |
| 4,411,768 A | 10/1983 | Unger et al. | 208/59 |
| 4,422,927 A | 12/1983 | Kowalczyk et al. | 208/211 |
| 4,435,314 A | 3/1984 | van de Leemput et al. | 502/154 |
| 4,465,630 A | 8/1984 | Akashi et al. | |
| 4,467,049 A | 8/1984 | Yoshii et al. | 502/317 |
| 4,485,004 A | 11/1984 | Fisher et al. | 208/107 |
| 4,581,344 A | 4/1986 | Ledoux et al. | 502/304 |
| 4,585,545 A | 4/1986 | Yancey, Jr. et al. | |
| 4,590,172 A | 5/1986 | Isaacs | 502/160 |
| 4,592,827 A | 6/1986 | Galiasso et al. | 208/59 |
| 4,592,830 A | 6/1986 | Howell et al. | 208/94 |
| 4,606,809 A | 8/1986 | Garg | 208/59 |
| 4,633,001 A * | 12/1986 | Cells | 554/71 |
| 4,652,311 A | 3/1987 | Gulla et al. | |
| 4,652,647 A | 3/1987 | Schlosberg et al. | |
| 4,693,991 A | 9/1987 | Bjornson et al. | |
| 4,695,369 A | 9/1987 | Garg et al. | 208/112 |
| 4,707,245 A | 11/1987 | Baldasarri et al. | 208/57 |
| 4,707,246 A | 11/1987 | Gardner et al. | |
| 4,713,167 A | 12/1987 | Reno et al. | 208/59 |
| 4,716,142 A | 12/1987 | Laine et al. | 502/220 |
| 4,734,186 A | 3/1988 | Parrott et al. | |
| 4,762,607 A | 8/1988 | Aldridge et al. | 208/59 |
| 4,762,814 A | 8/1988 | Parrott et al. | |
| 4,765,882 A | 8/1988 | Aldridge et al. | 208/59 |
| 4,770,764 A | 9/1988 | Ohtake et al. | 208/73 |
| 4,802,972 A | 2/1989 | Kukes et al. | |
| 4,812,228 A | 3/1989 | Angevine et al. | |
| 4,824,611 A | 4/1989 | Cells | 260/414 |
| 4,834,865 A | 5/1989 | Kukes et al. | 208/59 |
| 4,863,887 A | 9/1989 | Ohtake et al. | |
| 5,017,712 A | 5/1991 | Usui et al. | 549/529 |
| 5,114,900 A | 5/1992 | King | |

(Continued)

FOREIGN PATENT DOCUMENTS

CA 2004882 6/1991

(Continued)

OTHER PUBLICATIONS

Papaioannou et al., "Alkali-Metal- and Alkaline-Earth-Promoted Catalysts for Coal Liquefaction Applications", Energy & Fuels, vol. 4, No. 1, pp. 38-42 (1990).

(Continued)

*Primary Examiner*—Jerry Lorengo
*Assistant Examiner*—James E McDonough
(74) *Attorney, Agent, or Firm*—Workman Nydegger

(57) ABSTRACT

Hydrocarbon-soluble molybdenum catalyst precursors include a plurality of molybdenum cations that are each bonded with a plurality of organic anions to form an oil soluble molybdenum salt. A portion of the molybdenum atoms are in the 3+ oxidation state such that the plurality of molybdenum atoms has an average oxidation state of less than 4+, e.g., less than about 3.8+, especially less than about 3.5+. The catalyst precursors can form a hydroprocessing molybdenum sulfide catalyst in heavy oil feedstocks. The oil soluble molybdenum salts are manufactured in the presence of a reducing agent, such as hydrogen gas, to obtain the molybdenum in the desired oxidation state. Preferably the reaction is performed with hydrogen or an organic reducing agent and at a temperature such that the molybdenum atoms are reduced to eliminate substantially all molybdenum oxide species.

25 Claims, No Drawings

U.S. PATENT DOCUMENTS

| | | | |
|---|---|---|---|
| 5,171,916 A | 12/1992 | Le et al. | |
| 5,254,240 A | 10/1993 | Galiassco et al. | |
| 5,332,709 A | 7/1994 | Nappier et al. | 502/211 |
| 5,358,634 A | 10/1994 | Rankel | |
| 5,364,524 A | 11/1994 | Partridge et al. | |
| 5,372,705 A | 12/1994 | Bhattacharya et al. | 208/112 |
| 5,474,977 A | 12/1995 | Gatsis | |
| 5,578,197 A | 11/1996 | Cyr et al. | 208/112 |
| 5,622,616 A | 4/1997 | Porter et al. | 208/108 |
| 5,866,501 A | 2/1999 | Pradhan et al. | 502/338 |
| 5,868,923 A | 2/1999 | Porter et al. | 208/113 |
| 5,871,638 A | 2/1999 | Pradhan et al. | 208/422 |
| 5,916,432 A | 6/1999 | McFarlane et al. | 208/153 |
| 5,935,419 A | 8/1999 | Khan et al. | |
| 5,954,945 A | 9/1999 | Cayton et al. | 208/108 |
| 5,962,364 A | 10/1999 | Wilson, Jr. et al. | |
| 6,059,957 A | 5/2000 | Khan et al. | 208/108 |
| 6,068,758 A | 5/2000 | Strausz | 208/108 |
| 6,093,824 A | 7/2000 | Reichle et al. | |
| 6,136,179 A | 10/2000 | Sherwood, Jr. et al. | 208/109 |
| 6,139,723 A | 10/2000 | Pelrine et al. | 208/422 |
| 6,214,195 B1 | 4/2001 | Yadav et al. | |
| 6,274,530 B1 | 8/2001 | Cayton et al. | |
| 6,379,532 B1 | 4/2002 | Hoehn et al. | |
| 6,455,594 B1 | 9/2002 | Tsuji | |
| 6,462,095 B1 | 10/2002 | Bönsel et al. | |
| 6,596,155 B1 | 7/2003 | Gates et al. | |
| 6,660,157 B2 | 12/2003 | Que et al. | 208/108 |
| 6,686,308 B2 | 2/2004 | Mao et al. | |
| 6,712,955 B1 | 3/2004 | Hou et al. | 208/216 |
| 6,884,340 B1 | 4/2005 | Bogdan | |
| 6,916,762 B2 | 7/2005 | Shibuya et al. | |
| 7,011,807 B2 | 3/2006 | Zhou et al. | |
| 7,090,767 B2 | 8/2006 | Kaminsky et al. | |
| 2002/0179493 A1 | 12/2002 | Etter | |
| 2003/0094400 A1 | 5/2003 | Levy et al. | |
| 2003/0171207 A1 | 9/2003 | Shih et al. | |
| 2004/0147618 A1 | 7/2004 | Lee et al. | |
| 2005/0109674 A1 | 5/2005 | Klein | |
| 2005/0241991 A1 | 11/2005 | Lott et al. | |
| 2005/0241992 A1 | 11/2005 | Lott et al. | |
| 2005/0241993 A1 | 11/2005 | Lott et al. | |
| 2005/0258073 A1 | 11/2005 | Oballa et al. | |
| 2005/0279670 A1 | 12/2005 | Long et al. | |
| 2006/0079396 A1 | 4/2006 | Saito | |
| 2006/0224000 A1 | 10/2006 | Papp et al. | |
| 2006/0254956 A1 | 11/2006 | Khan | |
| 2006/0289340 A1 | 12/2006 | Brownscombe et al. | |
| 2007/0012595 A1 | 1/2007 | Brownscombe et al. | |
| 2007/0158236 A1 | 7/2007 | Zhou et al. | |
| 2007/0158238 A1 | 7/2007 | Wu et al. | |
| 2007/0175797 A1 | 8/2007 | Iki et al. | |
| 2007/0209965 A1 | 9/2007 | Duddy et al. | |

FOREIGN PATENT DOCUMENTS

| | | |
|---|---|---|
| CA | 2088402 | 7/1993 |
| EP | 0 199 399 | 10/1986 |
| JP | 06346064 | 12/1994 |
| WO | WO 2006116913 | 11/2006 |

OTHER PUBLICATIONS

Office Action dated Sep. 30, 2009 cited in U.S. Appl. No. 11/461,652.

* cited by examiner

HYDROCARBON-SOLUBLE MOLYBDENUM CATALYST PRECURSORS AND METHODS FOR MAKING SAME

BACKGROUND OF THE INVENTION

1. The Field of the Invention

The present invention is in the field of upgrading heavy oil feedstocks into lower boiling, higher quality materials. More particularly, the invention relates to catalyst precursors containing molybdenum salts that can be mixed with heavy oil feedstocks to form, in situ, a hydroprocessing catalyst and a method for making the catalyst precursors.

2. Related Technology

World demand for refined fossil fuels is ever-increasing and will eventually outstrip the supply of high quality crude oil. As the shortage of high quality crude oil increases there will be an increasing demand to find ways to better exploit lower quality feedstocks and extract fuel values from them.

Lower quality feedstocks are characterized as including relatively high quantities of hydrocarbons that have a boiling point of 524° C. (975° F.) or higher. They also contain relatively high concentrations of sulfur, nitrogen and/or metals. High boiling fractions typically have a high molecular weight and/or low hydrogen/carbon ratio, an example of which is a class of complex compounds collectively referred to as "asphaltenes". Asphaltenes are difficult to process and commonly cause fouling of conventional catalysts and hydroprocessing equipment.

Examples of lower quality feedstocks that contain relatively high concentrations of asphaltenes, sulfur, nitrogen and metals include heavy crude and oil sands bitumen, as well as bottom of the barrel and residuum left over from conventional refinery process (collectively "heavy oil"). The terms "bottom of the barrel" and "residuum" (or "resid") typically refer to atmospheric tower bottoms, which have a boiling point of at least 343° C. (650° F.), or vacuum tower bottoms, which have a boiling point of at least 524° C. (975° F.). The terms "resid pitch" and "vacuum residue" are commonly used to refer to fractions that have a boiling point of 524° C. (975° F.) or greater.

Converting heavy oil into useful end products requires extensive processing, including reducing the boiling point of the heavy oil, increasing the hydrogen-to-carbon ratio, and removing impurities such as metals, sulfur, nitrogen and carbon forming compounds.

When used with heavy oil, existing commercial catalytic hydrocracking processes become fouled or rapidly undergo catalyst deactivation. The undesirable reactions and fouling involved in hydrocracking heavy oil greatly increases the catalyst and maintenance costs of processing heavy oils, making current catalysts unsuitable for hydroprocessing heavy oil.

One promising technology for hydroprocessing heavy oils uses a hydrocarbon-soluble molybdenum salt that decomposes in the heavy oil during hydroprocessing to form, in situ, a hydroprocessing catalyst, namely molybdenum sulfide. One such process is disclosed in U.S. Pat. No. 5,578,197 to Cyr et al., which is incorporated herein by reference. Once formed in situ, the molybdenum sulfide catalyst is highly effective at breaking up asphaltenes and other complicated hydrocarbons while preventing fouling and coking.

A significant problem with commercializing oil soluble molybdenum catalysts is the cost of the catalyst. Even small improvements in catalyst performance can have a significant benefit to the cost of the hydrocracking process due to the increase in output and/or the reduced use of the catalyst.

The performance of oil soluble molybdenum catalysts depends significantly on the concentration of the metal in the heavy oil and on how well the catalyst precursor can be dispersed in the heavy oil. Improvements that can increase the percent of metal in the catalyst precursor while maintaining or improving solubility can improve the efficiency of hydrocracking heavy oils using oil soluble molybdenum compounds.

SUMMARY OF THE INVENTION

The present invention relates to catalyst precursors having a hydrocarbon soluble molybdenum salt that can form in situ a hydrocracking catalyst for upgrading heavy oil feedstocks. The catalyst precursor includes a molybdenum salt comprising a plurality of cationic molybdenum atoms and a plurality of organic anions. The organic anions preferably have between 2 and 14 carbon atoms. In a preferred embodiment, at least a portion of the molybdenum atoms are bonded with 3 organic anions and have an oxidation state of 3+ such that the plurality of molybdenum atoms have an average oxidation state of less than 4+.

To obtain a catalyst precursor with at least a portion of the molybdenum atoms in a 3+ oxidation state, the catalyst precursor is made using a strong reducing agent. Suitable reducing agents include hydrogen and/or organic reducing agents. The reducing agent reduces and stabilizes the molybdenum atoms during the reaction between the organic agent and the molybdenum atoms. Water is removed to make the reaction product soluble in heavy oil.

In a preferred embodiment, the method of the present invention produces a catalyst precursor with an average oxidation state of less than 4+. The $Mo^{3+}$ species present in the catalyst precursors enhance the in situ formation of the $MoS_2$ catalyst. The $Mo^{3+}$ atoms are less stable than other forms of molybdenum, such as $Mo^{4+}$, $Mo^{5+}$, and $Mo^{6+}$. Because $Mo^{3+}$ is less stable, it more readily decomposes in heavy oil and forms the desired catalytic molybdenum sulfide compounds. While the foregoing theories are believed to contribute at least in part to the improved performance of the catalysts of the present invention, the invention is not limited to these theories.

The use of a reducing agent can also be advantageous to prevent formation of undesired complexes between the molybdenum atom and oxidized species of the organic agent. The presence of the reducing agent inhibits the organic agent molecules from oxidizing one another and rapidly reduces the molybdenum atoms. By quickly reducing the molybdenum atoms and inhibiting the undesired oxidation of the organic agent molecules, the catalyst precursors of the present invention are less likely to form complexes between molybdenum atoms and undesired oxidized organic agent species, which can reduce performance of the catalyst precursor in the heavy oil.

Reducing the oxidation state of the molybdenum atoms to less than 4+ also increases the percentage of molybdenum in the catalyst precursor as compared to existing oil soluble molybdenum salts, which typically have an oxidation state equal to or greater than 4+. The inventors have found that molybdenum bound to only three organic anions can remain sufficiently soluble in heavy oil while increasing the weight percent of molybdenum. Increasing the percentage of molybdenum in the catalyst precursor can significantly reduce the cost of the catalyst precursor.

It is believed that the reducing agent can be helpful in reducing the amount of molybdenum oxides remaining in the final product and/or to reduce the amount of water bound to the molybdenum atoms and/or molybdenum salts. Hydrogen can be particularly effective at removing molybdenum oxides and/or water bound to the molybdenum salts. Catalyst precursors manufactured in the presence of hydrogen and/or organic reducing agents under the reaction conditions described herein have been found to have particularly good solubility and dispersion in hydrocarbons. It is believed that this increased solubility over existing catalyst precursors is due in part to the elimination of molybdenum oxides and/or to removal of bound water and/or undesired molybdenum complexes. However, the invention is not limited to these features of the invention.

The present invention also includes methods for making the molybdenum catalyst precursors. The methods of making the catalyst precursors generally include (1) providing a plurality of molybdenum atoms; (2) providing an organic agent comprising a plurality of organic molecules, preferably having between 2 and 14 carbon atoms; and (3) reacting the plurality of molybdenum atoms with the organic agent at a temperature greater than about 100° C. and in the presence of a reducing agent. The reaction yields a molybdenum salt wherein the molybdenum atoms have an average oxidation state of less than 4+, preferably less than about 3.8+, and more preferably less than about 3.5+.

The organic agent can be any $C_2$ to $C_{14}$ hydrocarbon that can react with molybdenum and form an anion. Examples of suitable organic agents include, butanoic acid, pentanoic acid, hexanoic acid, heptanoic acid, octanoic acid, decanoic acid, 2-ethyl butanoic acid, 2-methyl pentanoic acid, 2-ethyl hexanoic acid, and the like.

The hydroprocessing catalyst can be used in various kinds of reactors and hydrocracking processes to upgrade heavy oil. The hydroprocessing catalyst of the present invention can more effectively process asphaltene molecules, reduce or eliminate the formation of coke precursors and sediment, reduce equipment fouling, and/or increase conversion rates as compared to conventional hydroprocessing catalysts.

These and other benefits of the present invention will become more fully apparent from the following description and appended claims as set forth hereinafter.

DETAILED DESCRIPTION OF THE PREFERRED EMBODIMENTS

I. Introduction and Definitions

The present invention relates to hydrocarbon-soluble molybdenum catalyst precursors that can form a hydroprocessing molybdenum sulfide catalyst in heavy oil feedstocks and methods of making the catalyst precursor. The catalyst precursor includes a plurality of cationic molybdenum atoms bonded to a plurality of anionic organic molecules. In a preferred embodiment, at least a portion of the molybdenum atoms are in the 3+ oxidation state to give the plurality of catalyst atoms an average oxidation state of less than 4+, preferably less than about 3.8+, more preferably less than about 3.5+. The oil soluble molybdenum salts of the present invention are manufactured in the presence of a reducing agent to obtain the molybdenum atoms in the desired oxidation state. In a preferred embodiment, the reducing agent is hydrogen or an organic reducing agent.

The terms "colloidal catalyst" and "colloidally-dispersed catalyst" shall refer to catalyst particles having a particle size that is colloidal in size, e.g., less than about 100 nm in diameter, preferably less than about 10 nm in diameter, more preferably less than about 5 nm in diameter, and most preferably less than about 3 nm in diameter. The term "colloidal catalyst" includes, but is not limited to, molecular or molecularly-dispersed catalyst compounds.

The terms "molecular catalyst" and "molecularly-dispersed catalyst" shall refer to catalyst compounds that are essentially "dissolved" or completely dissociated from other catalyst compounds or molecules in a heavy oil hydrocarbon feedstock, non-volatile liquid fraction, bottoms fraction, resid, or other feedstock or product in which the catalyst may be found. It shall also refer to very small catalyst particles that only contain a few catalyst molecules joined together (e.g., 15 molecules or less).

The term "blended feedstock composition" shall refer to a heavy oil feedstock into which an oil soluble catalyst precursor composition has been combined and mixed sufficiently so that, upon decomposition of the catalyst precursor and formation of the catalyst, the catalyst will comprise a colloidal or molecular catalyst dispersed within the feedstock.

The term "heavy oil feedstock" shall refer to heavy crude, oil sands bitumen, bottom of the barrel and resid left over from refinery processes (e.g., visbreaker bottoms), and any other lower quality material that contains a substantial quantity of high boiling hydrocarbon fractions (e.g., that boil at or above 343° C. (650° F.), more particularly at or above about 524° C. (975° F.)), and/or that include a significant quantity of asphaltenes that can deactivate a solid supported catalyst and/or cause or result in the formation of coke precursors and sediment. Examples of heavy oil feedstocks include, but are not limited to, Lloydminster heavy oil, Cold Lake bitumen, Athabasca bitumen, atmospheric tower bottoms, vacuum tower bottoms, residuum (or "resid"), resid pitch, vacuum residue, and nonvolatile liquid fractions that remain after subjecting crude oil, bitumen from tar sands, liquefied coal, or coal tar feedstocks to distillation, hot separation, and the like and that contains higher boiling fractions and/or asphaltenes.

II. Components Used to Manufacture the Catalyst Precursors

The manufacture of the catalyst precursors of the present invention typically involves reacting a plurality of molybdenum atoms with a plurality of organic agent molecules in the presence of a reducing agent. If needed, the reaction can be carried out in a solvent.

A. Transition Metal Atoms

The primary metal component of the oil catalyst precursors is molybdenum. The molybdenum atoms are provided as a molybdenum compound that is capable of reacting with an organic agent (e.g., a carboxylic acid such as 2-ethyl hexanoic acid) to form a molybdenum salt. Suitable molybdenum compounds include molybdenum halides such as molybdenum hexafluoride and molybdenum pentachloride, the various oxides of molybdenum such as molybdenum dioxide, trioxide and sesquioxide, and the like; alkali and alkali earth molybdates such as cesium molybdate, sodium molybdate, potassium molybdate, calcium molybdate and the like; and ammonium molybdate or molybdic acid. In the preferred embodiment of this invention, molybdic acid is used.

Other metals can also be included in the catalyst precursors of the present invention. Suitable additional metals include transition metals other than molybdenum. The transition metal can be included in the reaction with the organic agents and/or blended with the molybdenum salts after manufacture. A preferred additional metal is cobalt.

B. Organic Agent Molecules

The organic agent is one or more oil-soluble organic compounds each having between 2 and 14 carbon atoms and a functional group suitable for reacting with a transition metal to form the anion of an oil soluble transition metal salt (e.g., a molybdenum salt). In a preferred embodiment, the organic agent is a carboxylic acid. Suitable carboxylic acids include aliphatic acids, alicyclic acids, aromatic acids, and phosphor-containing acids. Suitable aliphatic acids include butanoic acid, pentanoic acid, hexanoic acid, heptanoic acid, octanoic acid, decanoic acid, carboxylic acids with side chains located at the α, β, or γ positions (e.g., 2-ethyl butanoic acid, 2-methyl pentanoic acid, 2-ethyl hexanoic acid), and the like. Alicyclic acids include cyclohexanoic, cyclododecanoic and the like. Aromatic acid may contain one or two fused rings and contain from 7 to 14 carbon atoms where the carboxyl group may or may not be attached to the ring, such as benzoic, 1 or 2 naphthoic, o-, m-, p-toluic, phenylacetic, 1 or 2 naphthalene acetic, phenylbutyric acid and the like. Phosphor-containing organic compounds include 2-ethylhexyl phosphate, and the like. Aliphatic acids are preferred and 2-ethyl hexanoic acid is particularly preferred for its solubility in heavy oil and its relatively low cost.

Those skilled in the art will recognize that the organic agent molecules can be modified during the reaction with the molybdenum atoms. For example, in the reaction of a carboxylic acid with molybdenum the organic agent molecules can lose hydrogen to become a carboxylate anion.

In some cases, the organic agent can function as a solvent for the reaction. This is typically the case where the organic agent is a liquid under the reaction conditions (e.g., 2-ethyl hexanoic acid). However, if needed, other solvents can be used. The additional solvent should dissolve the organic agent and the molybdenum atoms and not interfere with the reaction between them. Suitable solvents include decant oil, liquid paraffin wax, benzene, toluene, xylene, naphtha, mineral oil, mineral spirits, combinations thereof, and the like.

C. Reducing Agents

The reducing agent is added to the reaction mixture to reduce the metal atoms to more readily form the metal salts and/or to obtain metal salts with a desired weight percent of metal in the catalyst precursor. In a preferred embodiment, a strong reducing agent is used to reduce and/or maintain at least a portion of the molybdenum atoms in an oxidation state below 4+. The average oxidation state of the molybdenum atoms is preferably less than about 3.8+, more preferably less than about 3.5+.

Any reducing agent that can reduce molybdenum to a 3+ oxidation state under the reaction conditions described below can be used with the present invention. The reducing agent is preferably hydrogen or an organic reducing agent. Suitable reducing agents include methane, ethane, olefins such as ethylene and propylene, aldehydes such as formaldehyde, and hydrogen. Hydrogen gas is a particularly preferred reducing agent because of its effectiveness and cost.

The suitability of the reducing agent often depends on the temperature at which the reaction is performed. At higher temperatures (e.g., 155° C.), organic reducing agents such as methane and formaldehyde have suitable reducing potential. However, at low temperatures (e.g., below 50° C.) or room temperature it can be advantageous to use a stronger reducing agent such as hydrogen gas.

III. Methods of Making Hydroprocessing Catalyst Precursors

The process for making hydroprocessing catalyst precursors according to the present invention comprises the direct reaction of a plurality molybdenum atoms with a plurality of organic agent molecules to form a hydrocarbon-soluble molybdenum salt. The reaction can be carried out with a molar ratio of molybdenum atoms to organic agent molecules of less than about 1:20, more preferably less than 1:4, even more preferably less than about 1:3.8, and most preferably less than about 1:3.5.

The reaction of the molybdenum atoms and the organic agent molecules is also carried out in the presence of a reducing agent. The reducing agent lowers the positive oxidation state of the molybdenum atoms. The molybdenum atoms, which are typically provided as a molybdenum oxide, are preferably reduced such that substantially no molybdenum oxide remains. By eliminating substantially all molybdenum oxides, the hydrocarbon-soluble molybdenum salts have improved solubility in comparison to commercially available hydrocarbon-soluble molybdenum salts.

In a preferred embodiment, the reducing agent and reaction conditions allow for the molybdenum to be reduced to a 3+ oxidation state. The reaction is carried out in a way that achieves a hydrocarbon-soluble molybdenum salt that has molybdenum atoms with an average oxidation state of less than 4+. In one embodiment, molybdenum salts with an average oxidation state of less than 4+ is achieved by reacting the molybdenum compound and the organic agent molecules in a molar ratio of molybdenum atoms to organic agent molecules of less than 1:4, preferably less than about 1:3.8, and more preferably less than about 1:3.5. The reducing agent is included in the reaction mixture in an amount sufficient to reduce and maintain at least a portion of the molybdenum atoms in a +3 oxidation state.

The combination of a molar ratio of organic agent molecules of less than 1:4 and a reducing environment allows for the formation of catalyst precursors having molybdenum atoms in an oxidation state of less than 4+. In a preferred embodiment, the reducing agent is hydrogen gas, which is passed through or by the reaction mixture to produce the reducing environment. Catalyst precursors having molybdenum atoms with an average oxidation state of less than 4+, preferably less than about 3.8+, more preferably less than about 3.5+, tend to have improved solubility in heavy oil, which improves the in situ formation of the molybdenum sulfide catalyst. In addition, catalyst with a lower oxidation state can have fewer organic agent molecules per molybdenum atom, thereby increasing the molybdenum concentration and reducing cost.

The reaction is preferably carried out at elevated temperatures. At elevated temperatures (e.g., above 100° C.), the solubility of the molybdenum compounds increases and a more complete reaction with the organic agent can be achieved. However, the reaction temperature is preferably maintained below about 300° C. to prevent the molybdenum salts from decomposing. In a preferred embodiment, the reaction is carried out at a temperature of from about 100° C. to about 350° C., more preferably between about 120° C. to about 280° C., and most preferably between about 150° C. to about 260° C. It is to be understood that among other factors, the temperature and duration of the reaction will depend upon the particular molybdenum compound and/or the particular organic agent used. The reaction is carried out for a sufficient length of time to allow for substantial reaction to take place, which is typically between about 2 hours and about 48 hours or more.

Maintaining a reducing environment during the reaction can be particularly advantageous because it causes the reaction between the molybdenum and the organic agent to occur more quickly. In addition, the presence of the reducing agent reduces the opportunity for the organic agent molecules to oxidize one another, which could otherwise result in the formation of undesired molybdenum complexes. The presence of the reducing agent during the reaction also helps stabilize the molybdenum atoms in the 3+ oxidation state, which is an oxidation state that is inherently less stable than other oxidation states, such as 4+.

Water is removed from the reaction mixture to obtain a reaction product that is soluble in heavy oil and to ensure that the molybdenum reaction proceeds. The water can be removed using any technique or combination of techniques. In a preferred embodiment, the reaction is carried out under conditions that exceed the boiling point of water such that water is removed as it is formed during the reaction. The water is allowed to escape from the reaction vessel as water vapor. Where hydrogen and/or another gas is being contacted with the reaction mixture, the water can escape with the gas. If desired, the gas and water vapor can be passed through a condenser to remove the water. Optionally, the gas can then be recycled through the reaction mixture.

It is believed that the reducing agent can be helpful to reduce the amount of water bound or complexed to the molybdenum atoms of the molybdenum salt and/or to reduce molybdenum oxide species. Catalyst precursors manufactured in the presence of hydrogen have been found to have particularly good solubility and dispersion in hydrocarbons. It is believed that this increased solubility over existing catalyst precursors is due in part to the removal of bound water and/or molybdenum oxide species that are not easily removed by heating. It is also believed to be advantageous to remove molybdenum oxides and/or bound water during the reaction and/or at elevated temperatures and/or in a reducing environment.

If needed, chemical drying agents can be employed to remove water from the reaction product, although this is usually not necessary. Any known drying technique can be used. For example, water may be removed by the use of dehydrating agents such as calcium chloride or an azeotropic agent. Those skilled in the art are familiar with dehydrating agents and azeotropic agents.

IV. Catalyst Precursor Compositions Containing Molybdenum

The oil soluble catalyst precursors of the present invention comprise a hydrocarbon-soluble molybdenum salt. The molybdenum salt includes a plurality of cationic molybdenum atoms and a plurality of organic anions, each anion preferably having between 2 and 14 carbon atoms. In a preferred embodiment, at least a portion of the molybdenum atoms are bonded with 3 organic anions and have an oxidation state of 3+ such that the plurality of molybdenum atoms have an average oxidation state of less than 4+, preferably less than about 3.8+, more preferably less than about 3.5+.

The percent molybdenum in the molybdenum salt is directly dependent on the number of organic anions bound to it and the molecular weight of the organic anions. As the number and weight of the organic anion increases, the weight percent of molybdenum decreases. As mentioned above, higher weight percent molybdenum is desired, so long as the catalyst precursor is soluble in hydrocarbons such as heavy oil. The inventors of the present invention have found that the number of organic anions per molybdenum atom can be reduced to 3 while still maintaining sufficient solubility in hydrocarbons such as heavy oil.

The reduced number of organic anions for at least a portion of the molybdenum salts of the present invention results in a catalyst precursor with an increase in weight percent of molybdenum. For example, where the organic anion is 2-ethyl hexanoate, a catalyst precursor having molybdenum atoms with an average oxidation of between 3 and 4 will have a weight percent between 19% and 14%. Thus, the weight percent of molybdenum can be increased without adversely affecting solubility by reducing the oxidation state of the molybdenum and consequently the number of organic anions bonded thereto.

V. Hydrocarbons Blended with Catalyst Precursors and Hydroprocessing Catalysts Formed Therefrom The catalyst precursors of the present invention can be included in a heavy oil feedstock to form a blended catalyst precursor. The catalyst precursors are designed to remain stable in a hydrocarbon up to a desired temperature. At an elevated temperature, the catalyst precursors decompose and react with sulfur in the heavy oil to form a molybdenum sulfide hydroprocessing catalyst.

The oil soluble catalyst precursors preferably have a decomposition temperature in a range from about 100° C. (212° F.) to about 350° C. (662° F.), more preferably in a range of about 150° C. (302° F.) to about 300° C. (572° F.), and most preferably in a range of about 175° C. (347° F.) to about 250° C. (482° F.). These preferred decomposition temperatures allow the catalyst precursor to be thoroughly mixed in a hydrocarbon (e.g., heavy oil) before decomposition occurs.

The catalyst precursor compositions can also be mixed with a diluent to form a mixture with a desirable concentration of molybdenum salt. Examples of suitable hydrocarbon diluents include, but are not limited to, vacuum gas oil (which typically has a boiling range of 360-524° C.), decant oil (which typically has a boiling range of 360-550° C.), and light gas oil (which typically has a boiling range of 200-360° C.).

The weight ratio of catalyst precursor composition to hydrocarbon oil diluent is preferably in a range of about 1:1000 to about 1:1, more preferably in a range of about 1:100 to about 1:1, and most preferably in a range of about 1:30 to about 1:1 (e.g., 1:20, 1:5 or 1:3).

The catalyst precursor composition can also be pre-mixed with a diluent prior to mixing the precursor with the heavy oil feedstock. The catalyst precursor composition is advantageously mixed with the hydrocarbon diluent at a temperature below which a significant portion of the catalyst precursor composition starts to decompose, preferably at temperatures in a range of about 25° C. to about 250° C., more preferably in a range of about 50° C. to about 200° C., and most preferably in a range of about 75° C. to about 150° C., to form the diluted precursor mixture. It will be appreciated that the actual temperature at which the diluted precursor mixture is formed typically depends largely on the decomposition temperature of the particular precursor composition that is utilized. The precursor composition is preferably mixed with the hydrocarbon oil diluent for a time period in a range of about ½ minute to about 20 minutes, more preferably in a range of about ¾ minute to about 10 minutes, and most preferably in a range of about 1 minute to about 3 minutes. The actual mixing time is dependent, at least in part, on the temperature (which affects the viscosity of the fluids) and mixing intensity. Mixing intensity is dependent, at least in part, on the number of mixing stages (e.g., for an in-line static mixer).

Whereas it is within the scope of the invention to directly blend the catalyst precursor composition with the heavy oil feedstock, care must be taken in such cases to mix the components for a time sufficient to thoroughly blend the precursor composition within the feedstock before substantial decomposition of the precursor composition has occurred. For example, U.S. Pat. No. 5,578,197 to Cyr et al. describes a method whereby molybdenum 2-ethyl hexanoate was mixed with bitumen vacuum tower residuum for 24 hours before the resulting mixture was heated in a reaction vessel to form the catalyst compound and to effect hydrocracking (see col. 10, lines 4-43). Whereas 24-hour mixing in a testing environment may be entirely acceptable, such long mixing times may make certain industrial operations prohibitively expensive.

It has been found that pre-blending the precursor composition with a hydrocarbon diluent prior to blending the diluted precursor mixture with the heavy oil feedstock greatly aids in thoroughly and intimately blending the precursor composition within the feedstock, particularly in the relatively short period of time required for large-scale industrial operations to be economically viable. Forming a diluted precursor mixture shortens the overall mixing time by (1) reducing or eliminating differences in solubility between the more polar catalyst precursor composition and the heavy oil feedstock, (2) reducing or eliminating differences in rheology between the catalyst precursor composition and the heavy oil feedstock, and/or (3) breaking up the catalyst precursor molecules to form a solute within a hydrocarbon oil diluent that is much more easily dispersed within the heavy oil feedstock. It is particularly advantageous to first form a diluted precursor mixture in the case where the heavy oil feedstock contains water (e.g., condensed water). Otherwise, the greater affinity of the water for the polar catalyst precursor composition can cause localized agglomeration of the precursor composition, resulting in poor dispersion and formation of micron-sized or larger catalyst particles. The hydrocarbon oil diluent is preferably substantially water-free (i.e., contains less than about 0.5% water) to prevent the formation of substantial quantities of micron-sized or larger catalyst particles.

The diluted precursor mixture is then combined with the heavy oil feedstock and mixed for a time sufficient and in a manner so as to disperse the catalyst precursor composition throughout the feedstock in order to yield a conditioned feedstock composition in which the precursor composition is thoroughly mixed within the heavy oil feedstock. In order to obtain sufficient mixing of the catalyst precursor composition within the heavy oil feedstock so as to yield a colloidal or molecular catalyst upon decomposition of the precursor composition, the diluted precursor mixture and heavy oil feedstock are preferably mixed for a time period in a range of about ½ minute to about 20 minutes, more preferably in a range from about 1 minute to about 10 minutes, and most preferably in a range of about 2 minutes to about 5 minutes. Increasing the vigorousness and/or shearing energy of the mixing process generally reduces the time required to effect thorough mixing.

Examples of a mixing apparatus that can be used to effect thorough mixing of the catalyst precursor composition and heavy oil feedstock include, but are not limited to, high shear mixing such as mixing created in a vessel with a propeller or turbine impeller, multiple static in-line mixers, or one or more multi-stage centrifugal pumps. According to one embodiment, continuous rather than batch-wise mixing can be carried out using high energy pumps having multiple chambers within which the catalyst precursor composition and heavy oil feedstock are churned and mixed as part of the pumping process itself. The foregoing mixing apparatus may also be used for the pre-mixing process discussed above in which the catalyst precursor composition is mixed with the hydrocarbon oil diluent to form the catalyst precursor mixture.

In the case of heavy oil feedstocks that are solid or extremely viscous at room temperature, such feedstocks may advantageously be heated in order to soften them and create a feedstock having sufficiently low viscosity so as to allow good mixing of the oil soluble catalyst precursor into the feedstock composition. In general, decreasing the viscosity of the heavy oil feedstock will reduce the time required to effect thorough and intimate mixing of the oil soluble precursor composition within the feedstock. However, the feedstock should not be heated to a temperature above which significant decomposition of the catalyst precursor composition occurs until after thorough and complete mixing to form the blended feedstock composition. Prematurely decomposing the catalyst precursor composition generally results in the formation of micron-sized or larger catalyst particles rather than a colloidal or molecular catalyst. The heavy oil feedstock and diluted precursor mixture are preferably mixed and conditioned at a temperature in a range of about 25° C. to about 350° C., more preferably in a range of about 50° C. to about 300° C., and most preferably in a range of about 75° C. to about 250° C. to yield the conditioned feedstock.

After the catalyst precursor composition has been well-mixed throughout the heavy oil feedstock so as to yield the conditioned feedstock composition, this composition is then heated to above the temperature where significant decomposition of the catalyst precursor composition occurs in order to liberate the catalyst metal therefrom so as to form the final active catalyst. According to one embodiment, the metal from the precursor composition is believed to first form a metal oxide, which then reacts with sulfur liberated from the heavy oil feedstock to yield a metal sulfide compound that is the final active catalyst. In the case where the heavy oil feedstock includes sufficient or excess sulfur, the final activated catalyst may be formed in situ by heating the heavy oil feedstock to a temperature sufficient to liberate the sulfur therefrom. In some cases, sulfur may be liberated at the same temperature that the precursor composition decomposes. In other cases, further heating to a higher temperature may be required.

If the oil soluble catalyst precursor composition is thoroughly mixed throughout the heavy oil feedstock, at least a substantial portion of the liberated metal ions will be sufficiently sheltered or shielded from other metal ions so that they can form a molecularly-dispersed catalyst upon reacting with sulfur to form the metal sulfide compound. Under some circumstances, minor agglomeration may occur, yielding colloidal-sized catalyst particles. However, it is believed that taking care to thoroughly mix the precursor composition throughout the feedstock will yield individual catalyst molecules rather than colloidal particles. Simply blending, while failing to sufficiently mix, the catalyst precursor composition with the feedstock typically causes formation of large agglomerated metal sulfide compounds that are micron-sized or larger.

In order to form the metal sulfide catalyst, the blended feedstock composition is preferably heated to a temperature in a range of about 200° C. to about 500° C., more preferably in a range of about 250° C. to about 450° C., and most preferably in a range of about 300° C. to about 400° C. According to one embodiment, the conditioned feedstock is heated to a temperature that is about 100° C. less than the hydrocracking temperature within the hydrocracking reactor. According to one embodiment, the colloidal or molecular catalyst is formed during preheating before the heavy oil feedstock is introduced into the hydrocracking reactor. According to another embodiment, at least a portion of the colloidal or molecular catalyst is formed in situ within the hydrocracking reactor itself. Once formed, in some cases, the colloidal or molecular catalyst can be formed as the heavy oil feedstock is heated to a hydrocracking temperature prior to or after the heavy oil feedstock is introduced into a hydrocracking reactor. The initial concentration of the catalyst metal in the colloidal or molecular catalyst is preferably in a range of about 1 ppm to about 500 ppm by weight of the heavy oil feedstock, more preferably in a range of about 5 ppm to about 300 ppm, and most preferably in a range of about 10 ppm to about 175 ppm. The catalyst may become more concentrated as volatile fractions are removed from the non-volatile resid fraction.

While the highly polar nature of the catalyst compound causes or allows the colloidal or the molecular catalyst to associate with asphaltene molecules, it is the general incompatibility between the highly polar catalyst compound and the hydrophobic heavy oil feedstock that necessitates the aforementioned intimate or thorough mixing of the oil soluble catalyst precursor composition within the heavy oil feedstock prior to decomposition of the precursor and formation of the colloidal or molecular catalyst. Because metal catalyst compounds are highly polar, they cannot be effectively dispersed within a heavy oil feedstock in colloidal or molecular form if added directly thereto or as part of an aqueous solution or an oil and water emulsion such methods inevitably yield micron-sized or larger catalyst particles.

VI. Examples

The following examples provide exemplary formulas for manufacturing catalyst precursors according to the present invention. Examples 1, 2, 3 and 4 provide formulas for making hydrocarbon molybdenum salts. In examples 1, 2, 3 and 4, the molybdenum salts were prepared using a condenser attached to a flask. Condensate was removed by opening a valve. Examples 5, 6, 7, 8 and 9 provide examples of catalyst precursors diluted with a hydrocarbon and used for hydrocracking heavy oil.

The composition of used heavy oil in examples 5, 6, 7, 8 and 9 is as follows. Elemental (w %): Carbon 81.61%, Hydrogen 9.86%, Sulfur 6.27%, Nitrogen 0.68%, Oxygen (calculated) 1.58%. The oil distillation (solids free) (w %): IBP-975° F. 21.16%, 975° F.+ 78.84%.

Example 1

Example 1 describes a method for making a molybdenum catalyst precursor. 4.84 g of molybdic acid (Aldrich, $MoO_3 \geqq 85.0\%$) and 12.47 g of 2-ethylhexanoic acid (Aldrich, 99%) were mixed together in a flask and then heated while stirring and purging with 100 ml/min $N_2$ until the temperature of the overhead vapor near the liquid was about 185° C. The mixture was held for 1 hour at 185° C. and then purged with 100 ml of a mixture of 20% $H_2$ and 80% $N_2$ to replace $N_2$. The mixture was then held for 6 hours. The resulting molybdenum catalyst precursor had a molybdenum content of 18 wt %.

Example 2

Example 2 describes a method for making a molybdenum catalyst precursor. 4.84 g of molybdic acid (Aldrich, $MoO_3 \geqq 85.0\%$) and 13.15 g of heptanoic acid (Aldrich, 96%) were mixed together in a flask and then heated while stirring and purging with 100 ml/min $N_2$ until the temperature of the overhead vapor near the liquid was about 185° C. The mixture was held for 1 hour at 185° C. and then purged with 100 ml of a mixture of 20% $H_2$ and 80% $N_2$ to replace $N_2$. The mixture was then held for 6 hours. The resulting molybdenum catalyst precursor had a molybdenum content of 18 wt %.

Example 3

Example 3 describes a method of making a molybdenum catalyst precursor. 30.0 g of molybdic acid (Aldrich, $MoO_3 \geqq 85.0\%$) and 102.2 g of 2-ethyl hexanoic acid (Aldrich, 99%) were mixed together in a flask and heated to 200° C. for 1 hour while stirring and purging with 100 ml/min of $N_2$. The mixture was then purged with a mixture of 20% $H_2$ and 80% $N_2$ and held at the same temperature for 12 hours. The resulting molybdenum 2-ethyl hexanoate contained 14.6 wt % Mo.

Example 4

Example 4 describes a method of making a molybdenum catalyst precursor. 18.7 gram of the molybdenum 2-ethyl hexanoate prepared according to Example 3 is mixed with 28.5 grams of 2-ethylhexyl phosphate. The resulting molybdenum 2-ethyl hexanoate contained 5.9 wt % Mo.

Example 5

Example 5 describes the use of a molybdenum catalyst precursor in a hydrocracking process. A diluted catalyst precursor was prepared by diluting the catalyst precursor of Example 1 in decant oil to make total weight 300.0 g. The decant oil and catalyst precursor were heated to about 80° C. and stirred. The mixture was shaken until it was homogeneous. The sample was then mixed with heavy oil at the weight ratio of 2 g/181 g and fed in the Reactor A for hydrocracking.

Example 6

Example 6 describes the use of a molybdenum catalyst precursor in a hydrocracking process. A diluted catalyst precursor was prepared by diluting the catalyst precursor of Example 2 in decant oil to make total weight 300.0 g. The decant oil and catalyst precursor were heated to about 80° C. and stirred. The mixture was shaken until it was homogeneous. The sample was then mixed with heavy oil at the weight ratio of 2 g/181 g and fed in the Reactor B for hydrocracking.

Example 7

Example 7 describes the use of a molybdenum catalyst precursor in a hydrocracking process. 18.7 g of the molybdenum 2-ethyl hexanoate prepared according to Example 3 was mixed with 281.3 g of decant oil to produce a catalyst slurry with 9150 ppm of catalyst. 2 g of this catalyst slurry was mixed with 181 g of heavy oil to form the final feed, and the mixture was fed in the Reactor A for the hydrocracking process.

Example 8

Example 8 describes the use of a molybdenum catalyst precursor in a hydrocracking process. A diluted catalyst precursor was prepared by diluting the catalyst precursor of Example 4 in decant oil to make total weight 300.0 g. The mixture was shaken until it was homogeneous. The sample was then mixed with heavy oil at the weight ratio of 2 g/181 g and fed in the Reactor B for hydrocracking.

Example 9

Comparison

Example 9 describes the use of a commercially available molybdenum catalyst precursor in a hydrocracking process. 18.3 g of the comparison molybdenum 2-ethyl hexanoate (15.0% Mo) was mixed with 281.7 g of decant oil to produce a catalyst slurry with 9150 ppm of catalyst. 2 g of the catalyst slurry was mixed with 181 g of heavy oil to form the final feed for hydrocracking. Catalyst prepared according to Example 9 was fed into Reactors A and Reactor B for comparison purposes.

Reactor Conditions and Results

The hydrocracking reaction for Examples 5 and 7 were carried out in Reactor A, while the hydrocracking reaction for Examples 6 and 8 were carried out in Reactor B. Reaction conditions in Reactors A and B were identical with a reaction temperature of 824.5° F., reaction pressure of 2200 psig, and a weight ratio of $H_2$ to feed oil of 19 g/181 g. The following tables summarize the reaction results:

TABLE A

Reaction results in Reactor A

| Catalyst Sample | Comparison | Example 5 | Example 7 |
|---|---|---|---|
| Process conversion (w %) | 81.3 | 84.5 | 84.1 |
| Process HI conversion (w %) | 76.6 | 81.4 | 84.2 |
| Process Asph conversion (w %) | 79.4 | 83.5 | 84.8 |
| $C_1$-$C_3$ gas yield (w %) | 4.91 | 5.84 | 7.27 |
| Bottoms IP-375° F. sediment (w %) | 1.26 | 1.42 | 0.71 |

TABLE B

Reaction results in Reactor B

| Catalyst Sample | Comparison | Example 6 | Example 8 |
|---|---|---|---|
| Process conversion (w %) | 80.5 | 83.5 | 82.8 |
| Process HI conversion (w %) | 76.9 | 80.7 | 77.8 |
| Process Asph conversion (w %) | 80.9 | 82.6 | 81.2 |
| $C_1$-$C_3$ gas yield (w %) | 5.55 | 5.61 | 5.81 |
| Bottoms IP-375° F. sediment (w %) | 1.71 | 0.88 | 1.72 |

As can be seen from the results, the catalyst for each of Examples 5-8 showed improved conversion of hydrocarbons as compared with the commercially available molybdenum catalyst precursor.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of making a molybdenum catalyst precursor for hydrocracking heavy oil, comprising:

providing a plurality of molybdenum atoms;

providing an organic agent comprising a plurality of organic molecules having at least one functional group that is reactive with the molybdenum atoms; and reacting the plurality of molybdenum atoms with the organic agent in the presence of a reducing agent and in a molar ratio of molybdenum atoms to organic molecules of less than 1:4 to yield the molybdenum catalyst precursor comprised of a molybdenum salt having a plurality of molybdenum atoms with an average oxidation state of less than 4+.

2. A method as in claim 1, wherein the reducing agent comprises hydrogen or an organic reducing agent or both.

3. A method as in claim 1, wherein the plurality of organic anions comprises anions having between 2 and 14 carbon atoms.

4. A method as in claim 1, wherein the organic anion is a carboxylate anion.

5. A molybdenum catalyst precursor as in claim 4, wherein the carboxylate anions are selected from the group consisting of butanoic acid, pentanoic acid, hexanoic acid, heptanoic acid, octanoic acid, decanoic acid, 2-ethyl butanoic acid, 2-methyl pentanoic acid, 2-ethyl hexanoic acid, and combinations thereof.

6. A method as in claim 1, wherein the weight percent molybdenum in the molybdenum catalyst precursor is greater than about 15.5%.

7. A method as in claim 1, wherein the percent of molybdenum in the molybdenum catalyst precursor is greater than about 17%.

8. A method as in claim 1, further comprising reacting one or more additional metal salts comprising a transition metal other than molybdenum with the organic agent.

9. A method as in claim 1, further comprising forming a diluted molybdenum catalyst precursor by mixing the molybdenum catalyst precursor with a diluent.

10. A method as in claim 9, further comprising forming a blended heavy oil feedstock by mixing the diluted molybdenum catalyst precursor with a heavy oil feedstock.

11. A method as in claim 1, further comprising forming a blended heavy oil feedstock by mixing the molybdenum catalyst precursor with a heavy oil feedstock.

12. A method as in claim 1, wherein the reducing agent comprises hydrogen and optionally an organic reducing agent selected from the group consisting of methane, ethane, olefins, ethylene, propylene, aldehydes and formaldehyde.

13. A method as in claim 1, wherein the reaction between the plurality of molybdenum atoms and organic agent in the presence of the reducing agent is carried out at a temperature above about 100° C. such that water in the reaction product is removed as the reaction product is formed.

14. A method as in claim 1, wherein the reaction between the plurality of molybdenum atoms and organic agent in the presence of the reducing agent is performed at a temperature greater than 155° C.

15. A method as in claim 1, wherein the reaction mixture is purged with an inert gas prior to reducing with the reducing agent.

16. A method as in claim 1, wherein the average oxidation state of the molybdenum atoms of the molybdenum catalyst precursor is less than about 3.8+.

17. A method as in claim 1, wherein the average oxidation state of the molybdenum atoms of the molybdenum catalyst precursor is less than about 3.5+.

18. A method as in claim 1, wherein the molybdenum catalyst precursor forms a molybdenum salt having fewer complexed molecules that inhibit the molybdenum salt from forming a molybdenum sulfide compound than catalyst precursors manufactured without the use of the reducing agent.

19. A method of making a molybdenum catalyst precursor suitable for hydrocracking heavy oil, comprising:

providing a plurality of molybdenum atoms;

providing an organic agent comprising a plurality of organic molecules having at least one functional group that is reactive with the molybdenum atoms;

reacting the plurality of molybdenum atoms with the organic agent in the presence of hydrogen and/or an organic reducing agent selected from the group consisting of methane, ethane, olefins, ethylene, propylene, aldehydes and formaldehyde at a temperature greater than about 90° C. to form a reaction product comprising a hydrocarbon-soluble molybdenum salt including a plurality of molybdenum atoms with an average oxidation state of less than 3.8+.

20. A method as in claim 19, wherein the organic agent molecules are selected from the group consisting of butanoic acid, pentanoic acid, hexanoic acid, heptanoic acid, octanoic acid, decanoic acid, 2-ethyl butanoic acid, 2-methyl pentanoic acid, 2-ethyl hexanoic acid, and combinations thereof.

21. A method as in claim 19, wherein the molybdenum atoms are reacted with the organic agent in the presence of the hydrogen and/or the organic reducing agent at a temperature greater than about 100° C.

22. A method as in claim 19, wherein the molybdenum atoms are reacted with the organic agent in the presence of the hydrogen and/or the organic reducing agent at a temperature greater than 155° C.

23. A method as in claim 19, wherein the molybdenum catalyst precursor forms a molybdenum salt having higher solubility than a catalyst precursor prepared without the presence of hydrogen.

24. A method of making a molybdenum catalyst precursor for hydrocracking heavy oil, comprising:

providing a plurality of molybdenum atoms;

providing an organic agent comprising a plurality of organic molecules having at least one functional group that is reactive with the molybdenum atoms; and reacting the plurality of molybdenum atoms with the organic agent in the presence of hydrogen at a temperature greater than about 100° C. and in a molar ratio of molybdenum atoms to organic molecules of less than about 1:3.5 to yield the molybdenum catalyst precursor comprised of a molybdenum salt having a plurality of molybdenum atoms with an average oxidation state of less than about 3.5.

25. A method as in claim 1, wherein the molar ratio of molybdenum atoms to organic molecules is less than about 1:3.5.

* * * * *

UNITED STATES PATENT AND TRADEMARK OFFICE
CERTIFICATE OF CORRECTION

PATENT NO. : 7,670,984 B2
APPLICATION NO. : 11/327085
DATED : March 2, 2010
INVENTOR(S) : Wu et al.

It is certified that error appears in the above-identified patent and that said Letters Patent is hereby corrected as shown below:

Column 1
Line 17, after "increases" insert --,--
Line 34, change "process" to --processes--

Column 5
Line 57, change "temperature" to --temperature,--
Line 65, change "plurality molybdenum atoms" to --plurality of molybdenum atoms--

Column 6
Line 40, change "catalyst" to --catalysts--

Column 12
Line 19, change "18.7 gram" to --18.7 grams--
Line 41, change "make total weight" to --make total weight of--

Column 16
Line 22, change "3.5" to --3.5+--

Signed and Sealed this

Fourteenth Day of September, 2010

David J. Kappos
*Director of the United States Patent and Trademark Office*